United States Patent [19]

Bowsher

[11] Patent Number: 4,695,819
[45] Date of Patent: Sep. 22, 1987

[54] PEDAL DEVICE

[75] Inventor: Glynne T. Bowsher, Birmingham, England

[73] Assignee: Lucas Industries Public Limited Company, Birmingham, England

[21] Appl. No.: 839,550

[22] Filed: Mar. 14, 1986

[30] Foreign Application Priority Data

Mar. 21, 1985 [GB] United Kingdom ............... 8507300

[51] Int. Cl.$^4$ .......................................... H01C 10/00
[52] U.S. Cl. .................................... 338/153; 74/512; 74/560
[58] Field of Search ............... 338/153, 108, 96, 95; 74/560, 512, 513

[56] References Cited

U.S. PATENT DOCUMENTS

| | | | |
|---|---|---|---|
| 2,524,026 | 10/1950 | Best ................................. | 338/95 X |
| 2,582,343 | 1/1952 | Lilley ................................. | 338/95 |
| 3,743,998 | 7/1973 | Sturgeon ........................... | 338/96 |
| 4,380,002 | 4/1983 | Neill et al. ....................... | 338/153 |

Primary Examiner—E. A. Goldberg
Assistant Examiner—M. M. Lateef
Attorney, Agent, or Firm—Holman & Stern

[57] ABSTRACT

A pedal device, primarily for an electrically operated vehicle brake, uses a pedal pivotally mounted for angular movement relative to a base, a leaf spring attached to the free end of the pedal and stressed by being urged by angular movement against a surface of a bearing block, the location of engagement of the spring on the surface being progressively varied during pedal movement to obtain a predetermined ratio between pedal movement and pedal effort depending upon the location, and an electrical potentiometer arranged to be actuated by the pedal angular movement to produce an output proportional thereto.

20 Claims, 6 Drawing Figures

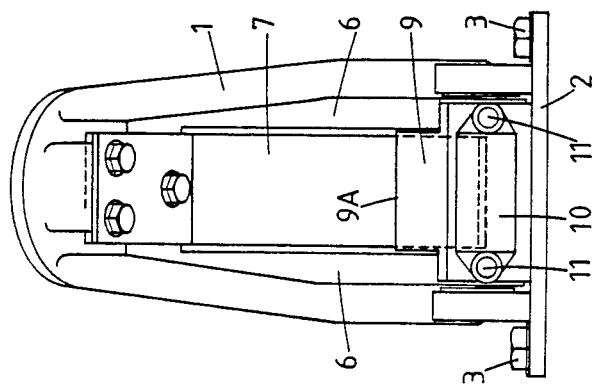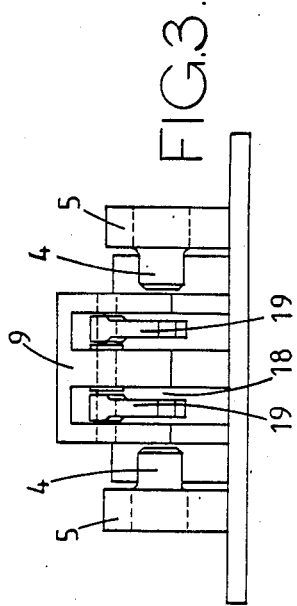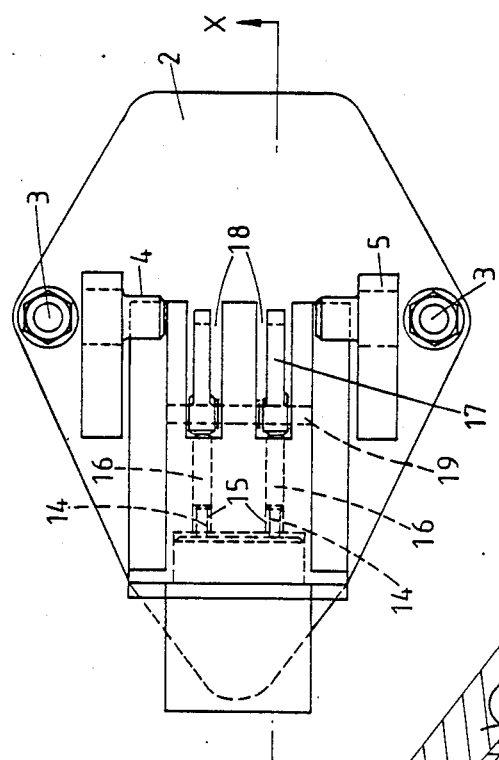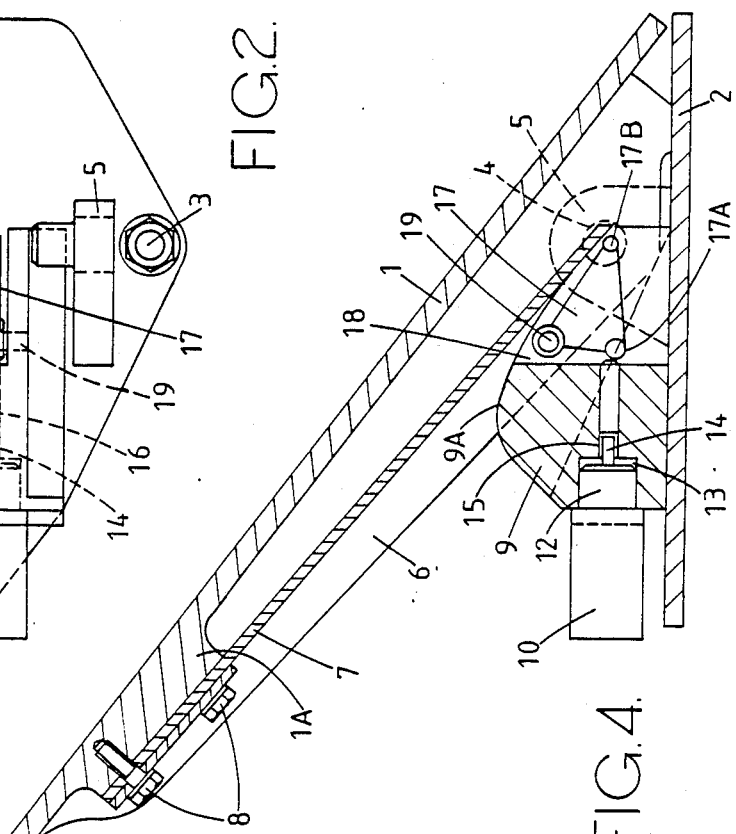

4,695,819

PEDAL DEVICE

BACKGROUND OF THE INVENTION

1. Field of the Invention

This invention relates to a pedal device, primarily for use in operating a vehicle brake by means of an electrically responsive remote actuator, and of the type in which pivotal movement of a pedal causes an electrical output device, such as a potentiometer, to produce an electrical output for transmission to the actuator.

2. Description of the Prior Art

During operation of a conventional vehicle hydraulic braking system, the force applied to the brake pedal is transmitted directly by the hydraulic system fluid to the brake actuators and thus determines the applied braking effort. The pedal effort required from the operator therefore varies in proportion to the degree of braking required and can normally be sensed satisfactorily from the "feel" of the pedal. Pedal movement, once the fixed brake clearances have been taken up, is small and is governed by the compression and expansion of individual brake components. Ideally, the pedal should be truly progressive in movement and load, allowing pedal loads to vary exponentially with the degree of pedal movement, and yet have an output which is proportional to pedal load. Typically, this ideal pedal will produce perhaps 50% of the maximum braking effort over perhaps 75% of its range of movement, giving good sensitivity and feel over the most commonly used braking range, and then providing a progressively harder feel in the lesser used high deceleration/emergency range as full braking effort is reached.

With an electrically operated brake, there is no feedback from the brake to the pedal and the pedal has to be arranged to have a built-in resistance to operative movement which corresponds as closely as possible to the applied braking effort, while at the same time producing an electrical output from the electrical output device to achieve a desired variation in the braking effort in response to the pedal operative position. These two requirements are difficult to match sufficiently closely to produce a reasonable practical compromise and conventional devices of this type have been found to be less than satisfactory in operation and/or excessively complicated.

BRIEF SUMMARY OF THE INVENTION

An object of the present invention is to provide a pedal device, primarily for use in operating a vehicle brake by means of an electrically responsive actuator, which has improved performance and is of relatively simple construction compared with some conventional devices.

According to the present invention, a pedal device comprises a pedal pivotally mounted for angular movement, a leaf or similar spring connected to the pedal in cantilever manner, an output device arranged for operation by the pedal to produce an electrical output in response to pedal movement, and bearing means providing a surface against which the spring is urged by said angular movement and thereby stressed, this surface being such that the location of engagement of the spring thereon varies progressively during pedal angular movement, whereby there is produced a predetermined ratio between pedal movement and pedal effort depending upon the location of the engagement.

The output device, may conveniently be such that its electrical output is directly proportional to the movement of a part thereof and is preferably a linear output potentiometer, the device being connected to the pedal in such a manner that movement of said part as a result of pedal movement produces a non-linear electrical output generally proportional, and preferably varying exponentially, to pedal movement.

In one convenient arrangement, the movable part of the output device is urged against a follower device interposed between that part and a free end portion of the spring which moves away from the surface of the bearing means during pedal angular movement, the follower device being such that the non-linearity of the spring movement is imposed upon the movement of the part to produce an approximately corresponding non-linear movement of the part and thereby a non-linear electrical output generally proportional to pedal load.

The follower device may conveniently be a bell-crank lever, the lengths of the arms of which are chosen to provide the desired relationship between the movement of the part and pedal movement.

BRIEF DESCRIPTION OF THE DRAWING

The invention will now be described, by way of example, with reference to the accompanying drawings wherein:

FIG. 1 is an end elevational view from the left of FIG. 2 or 4 of one form of the pedal device of the invention;

FIG. 2 is a top plan view of the device of FIG. 1 with part thereof removed;

FIG. 3 is an end elevational view from the opposite end to that of FIG. 1 with the pedal omitted;

FIG. 4 is a cross sectional view taken along line X—X of FIG. 2 with the missing part replaced;

DETAILED DESCRIPTION

Figures 5, 6:
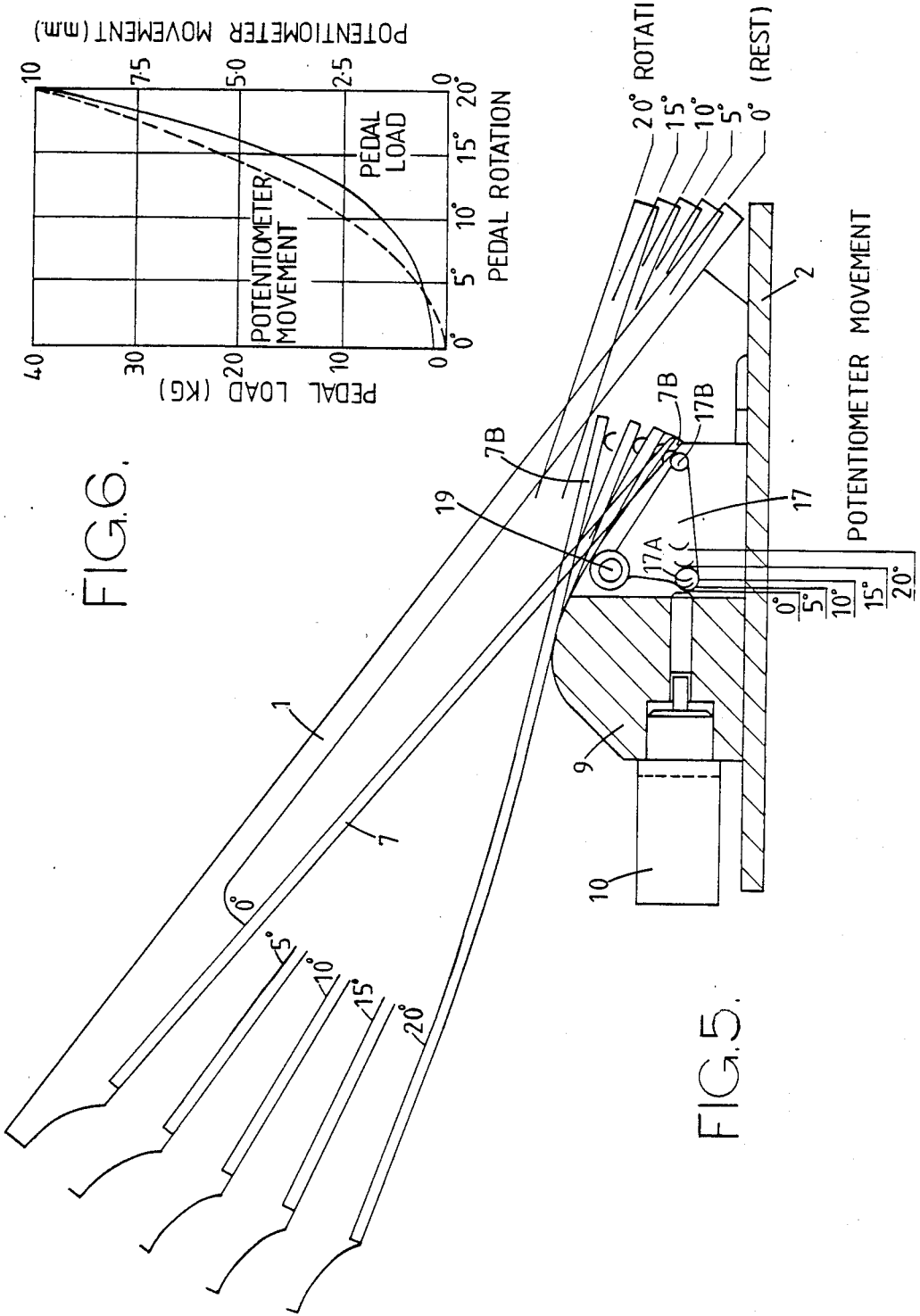
FIG. 5 is an enlarged side elevational view of the device of FIGS. 1 to 4, partly in cross section, illustrated in various stages of operation.
FIG. 6 is a graph illustrating the inter-relationships between various parameters resulting from operation of the pedal device of FIGS. 1 to 5.

Referring to FIGS. 1 to 4, the pedal device illustrated includes a pedal 1 pivotally mounted on a base 2 which would normally be fixed to a supporting surface, such as the floor of a vehicle cabin for example, by means of bolts 3. The pivotal mounting of the pedal is effected by means of a pair of bearing pins 4 mounted respectively in spaced lugs 5, between which are inserted a pair of spaced parallel webs 6 of the pedal (FIGS. 1 and 3) the pins 4 being inserted in corresponding holes in the webs. A leaf spring 7 is secured to a raised portion 1A on the underside of the pedal by bolts 8 and extends longitudinally of the pedal in cantilever manner, its free end portion engaging the upper surface 9A of bearing means in the form of a body or block 9 secured to the base 2.

The pedal device incorporates means for producing an electrical output for supply to an electrically operated brake actuator, such device being in the form of a potentiometer 10 secured to an end surface of the block 9 by means of bolts 11 (FIG. 1). Part of the potentiometer is in the form of a boss 12 which is housed within a corresponding opening 13 of the block 9 and a pair of potentiometer actuating stems 14 project from the boss 12 into a pair of parallel bores 15 formed in the block. The bores also contain respective force transmission pins 16, an end of each of which engages a respective one of the stems 14, the other ends of the pins 16 engaging against the ends 17A of first respective arms of a pair of followers in the form of bell crank levers 17 housed in respective slots 18 of the block 9 and pivoted to the block by pins 19. The ends 17B of second respective arms of the bell crank levers 17 engage the spring 7 towards the free end of the latter, the bell crank lever being urged continually against the spring by resilient means (not shown) associated with the potentiometer 10.

Operation of the pedal device will now be described with reference to FIGS. 5 and 6. As mentioned previously, one of the requirements in a pedal of this type is that the pedal 1 should have a resistance to operative movement which corresponds as closely as possible to the braking effort applied by a brake controlled by the pedal, which broadly speaking means that the initial pedal movement should be subject to relatively small resistance, and that such resistance should increase to a maximum at the fullest extent of pedal operative movement corresponding to maximum braking effort from the system under control. A simultaneous requirement is that the output from the potentiometer 10 (which is proportional to potentiometer movement) should correspond as closely as possible to the pedal resistance so that such resistance is matched as closely as possible to the applied braking effort controlled by the potentiometer.

The first requirement concerning pedal effort is achieved in the present embodiment, by the use in conjunction with the spring 7, of the block 9, the upper surface 9A of which is engaged by the spring 7 and is typically of true arcuate form, although it could be of any suitable calculated form which is not truly arcuate. As can be seen from FIG. 5, which illustrates the pedal in various stages of depression, the spring 7 effectively rolls over the surface 9A so that its point of flexing varies progressively as its location of engagement with the surface 9A changes. The point of loading the spring is thereby moved towards the origin of the cantilever and, as the spring shortens, the effort required to produce further deflection increases rapidly, being dependent upon the cube of the spring length. FIG. 5 illustrates the pedal in several stages of depression represented at 5 degree integers of angular rotation and the progressive rolling of the spring over the surface 9A and corresponding shortening of the spring length is clearly illustrated.

It is convenient, for reasons of availability and cheapness, to use a linear output potentiometer which, of itself, is unsuitable to provide the varying output required to match the pedal effort.

The use of the bell crank lever between the movable part of the potentiometer and the free end 7B of the spring enables the second requirement to be achieved using such a potentiometer. It will be seen that the free end portion 7B moves upwardly during depression of the pedal 1, as well as increasing in length. Since the bell crank lever 17 is spring urged against the end portion 7B, this lever will pivot about the pin 19 to follow movement of the spring. The effective arms of the bell crank lever 17 respectively between the pivot 19 and the locations 17A and 17B of the lever are chosen such that the potentiometer movement, and therefore its output, vary in general correspondence with the spring deflection and therefore load. This is clearly illustrated in FIG. 6, from which it can be seen that the curves representing respectively pedal rotation plotted against pedal load and potentiometer movement plotted against pedal rotation are very closely similar and approximate closely therefore to the ideal relationship between pedal load and potentiometer output.

The graph illustrates that some pedal load is provided for zero pedal rotation, the leaf spring being slightly pre-loaded against the surface 9A when the pedal is in its initial rest position in order to take up any manufacturing tolerances. In addition, a suitable device such as a spring or dashpot (not shown) may be provided to balance the weight of the pedal parts and compensate for any effective weight increases of these parts caused by vertical accelerations to which the pedal may be subjected in use on a vehicle.

When translated into pedal "feel" as experienced by a vehicle driver, the pedal of the invention approximates fairly closely to that experienced in a conventional hydraulic arrangement in which the operator expects to apply more load in order to achieve heavier vehicle braking. This is because it produces an exponential relationship between pedal load and angle of pedal rotation which approximates to the "ideal" while a near linear relationship is achieved between pedal load and electrical output. This is achieved, by means of the invention, in a very simple and inexpensive manner. Moreover, the arrangement is compact and is extremely simple to install by bolting to a vehicle floor or bulkhead at an appropriate location and connecting the necessary wiring for electrical operation of the brake actuator.

Moreover, since the device of the invention in the form described has a pair of potentiometers, it provides a dual output for use with split system braking arrangements. This can be varied by changing the number of potentiometers actuated by the pedal in order to provide more or less outputs, as required. When a plurality of potentiometers is provided, the leaf spring 7 may be split longitudinally and arranged so that each spring part actuates a respective potentiometer. This arrangement provides a degree of security against breakage or other failure of the spring and is especially useful in conjunction with a split system in which the potentiometers respectively actuate mutually isolated parts of the system.

I claim:

1. A pedal device comprising:
    a pedal pivotally mounted for rotation about a pivot axis;
    a leaf spring mounted on said pedal in a cantilever manner;
    a bearing means;
    a bearing surface on said bearing means engageable with said leaf spring and having a configuration and location relative to said leaf spring so that the position of engagement varies during rotation of said pedal to produce a predetermined ratio between pedal movement and pedal load depending on said position of engagement; and
    an output device mounted in a position relative to said pedal and adapted to be operated by said pedal for producing an electrical output in response to pedal rotation movement.
2. A pedal device as claimed in claim 1 wherein:
    said leaf spring is connected adjacent one end thereof to said pedal and engages said bearing surface adjacent the other end thereof.
3. A pedal device as claimed in claim 1 wherein:

said bearing surface has a substantially curved configuration extending in a direction which progressively shortens the distance between said position of engagement and the mounting of said leaf spring on said pedal and increases the resistance to deformation of said leaf spring as said pedal is rotated toward said bearing means.

4. A pedal device as claimed in claim 2 wherein:
said bearing surface has a substantially curved configuration extending in a direction which progressively shortens the distance between said position of engagement and the mounting of said leaf spring on said pedal and increases the resistance to deformation of said leaf spring as said pedal is rotated toward said bearing means.

5. A pedal device as claimed in claim 1 wherein:
said bearing means comprises a body of material disposed adjacent to said pedal; and
said bearing surface comprises an outer surface on said body of material.

6. A pedal device as claimed in claim 4 wherein:
said bearing means comprises a body of material disposed adjacent to said pedal; and
said bearing surface comprises an outer surface on said body of material.

7. A pedal device as claimed in claim 1 wherein:
said configuration of said bearing surface is of true arcuate form.

8. A pedal device as claimed in claim 6 wherein:
said configuration of said bearing surface is of true arcuate form.

9. A pedal device as claimed in claim 1 wherein:
said configuration of said bearing surface is of non-arcuate form.

10. A pedal device as claimed in claim 6 wherein:
said configuration of said bearing surface is of non-arcuate form.

11. A pedal device as claimed in claim 1 wherein said output device comprises:
a movable part acted upon by rotation of said pedal to produce an electrical output which is directly proportional to movement of said movable part, and non-linear and generally proportional to said pedal rotation.

12. A pedal device as claimed in claim 11 wherein:
said output device comprises a linear output potentiometer.

13. A pedal device as claimed in claim 11 and further comprising:
a free end on said leaf spring which moves away from said bearing surface as said pedal is rotated toward said bearing surface; and
a follower device interposed between said movable part and said free end of said leaf spring, said movable part being urged against said follower device, and said follower device having a form so that the leaf spring movement produces a corresponding non-linear movement of said movable part.

14. A pedal device as claimed in claim 13 wherein:
said output device comprises a linear output potentiometer.

15. A pedal device as claimed in claim 13 wherein:
said follower device comprises a bell-crank lever having arms of predetermined lengths to provide said electrical output.

16. A pedal device as claimed in claim 13 wherein:
said bearing means comprises a body of material disposed adjacent to said pedal;
said bearing surface comprises an outer surface on said bearing means; and
said follower device is mounted on said body for operative movement.

17. A pedal device as claimed in claim 15 wherein:
said bearing means comprises a body of material disposed adjacent to said pedal;
said bearing surface comprises an outer surface on said bearing means; and
said follower device is mounted on said body for operative movement.

18. A pedal device as claimed in claim 16 wherein:
said electrical output device is mounted on said body.

19. A pedal device as claimed in claim 17 wherein:
said electrical output device is mounted on said body.

20. A pedal device as claimed in claim 19 wherein:
said bearing surface has a substantially curved configuration extending in a direction which progressively shortens the distance between said position of engagement and the mounting of said leaf spring on said pedal and increases the resistance to deformation of said leaf spring as said pedal is rotated toward said bearing means.

* * * * *